United States Patent [19]
Courtney et al.

[11] 3,982,701
[45] Sept. 28, 1976

[54] ONE PIECE CORE AND PLATFORM FOR ENDLESS TAPE CARTRIDGES

[75] Inventors: David O. Courtney; Richard E. Coats, both of Excelsior Springs, Mo.

[73] Assignee: The Gates Rubber Company, Denver, Colo.

[22] Filed: May 27, 1975

[21] Appl. No.: 581,308

[52] U.S. Cl. .......................... 242/55.19 A; 352/128
[51] Int. Cl.² ........................................ B65H 17/48
[58] Field of Search ............... 242/55.19 A, 71.8; 360/93; 352/72, 78, 128

[56] References Cited
UNITED STATES PATENTS

| | | | |
|---|---|---|---|
| 3,420,463 | 1/1969 | Cousino | 242/55.19 A |
| 3,481,551 | 12/1969 | Steelman | 242/55.19 A |
| 3,617,010 | 11/1971 | Coy | 242/55.19 A |

Primary Examiner—Richard C. Queisser
Assistant Examiner—Charles Gorenstein
Attorney, Agent, or Firm—Raymond Fink; H. W. Oberg, Jr.; Curtis H. Castleman, Jr.

[57] ABSTRACT

This invention relates to an integrally molded core and platform for an endless array of magnetic tape for use in cartridges. The core is integrally connected to the platform in a one-piece construction. The upper exterior portion of the core is defined by two oppositely facing radii having a common tangent in order to minimize tape drag and hang-up or catching of the tape as it releases from the inside of the spool to be transported to the transducer head.

8 Claims, 5 Drawing Figures

ONE PIECE CORE AND PLATFORM FOR ENDLESS TAPE CARTRIDGES

BACKGROUND OF THE INVENTION

Previously, most platforms and cores used in cartridges to hold an endless array of magnetic tape were made in two sections. One piece is a platform serving as a disc base for the tape reel. The other piece is the core around which the tape is wound. The inner turns of the tape are then guided for release of the tape for transport to the magnetic pick-up head. This type of platform and core would be shown in U.S. Pat. No. 3,350,028 to Lear and would be fitted together by a snap fit of the core to the platform.

The U.S. Pat. to Coy, No. 3,617,010 shows a particular modification of a one-piece core and platform with castellated segments on the upper free extremity of the core. This core and platform is molded in a one-piece construction. The castellations are supplied in order to have a flexible, yieldable upper section in order to allow deformation of the upper extremity of the core to aid in release of the tape from the inner spool of the array.

In spite of such improvements, it has been found that it would be desirable to minimize tape drag and to reduce the amount of friction of the tape against the outer surface of the core to eliminate hang-up or catching of the tape as it is released from the inner part of the spool. Additionally, a configuration is desired to provide easier molding and mold release of a one-piece core and platform for tape cartridges by straight ahead molding and having no sliding cores.

Accordingly, an object of the invention is to provide an improved commercially acceptable one-piece core and platform for tape cartridges whereby tape drag is minimized with an accompanying reduction of possibility of hang-up of the tape from the spool.

Another object of the invention is to provide a core configuration such that straight ahead molding techniques may be utilized thereby eliminating mold parting lines resulting from sliding cores which may cause tape hang-up.

Other objects and advantages of the invention will become apparent from the detailed description taken in connection with the accompanying drawings in which.

SUMMARY OF THE INVENTION

Figure 1:
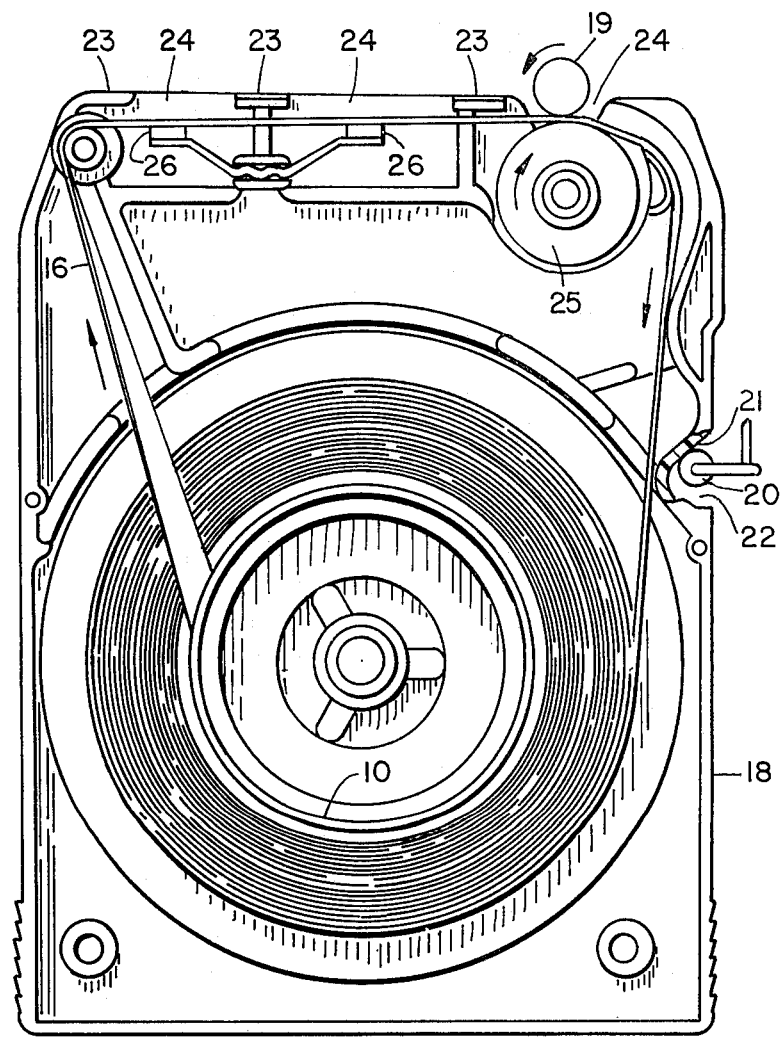
FIG. 1 is a top plan view of the cartridge interior with the cover removed.
Figure 2:
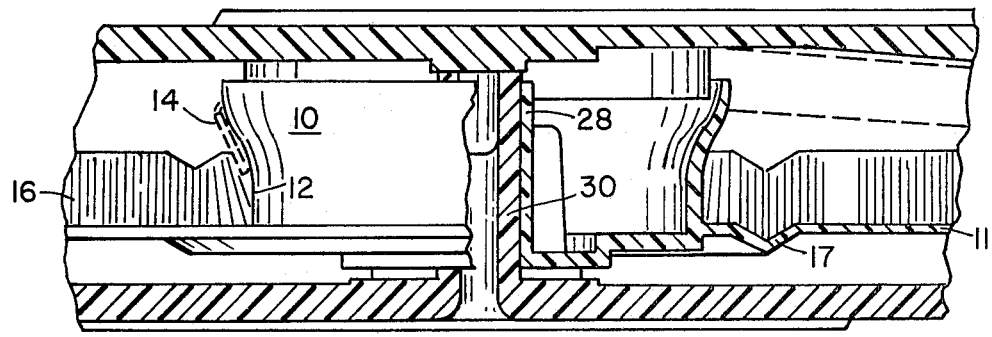
FIG. 2 is a partial cross section showing the core and platform with the tape thereon in place in the interior of the cartridge.
Figure 3:
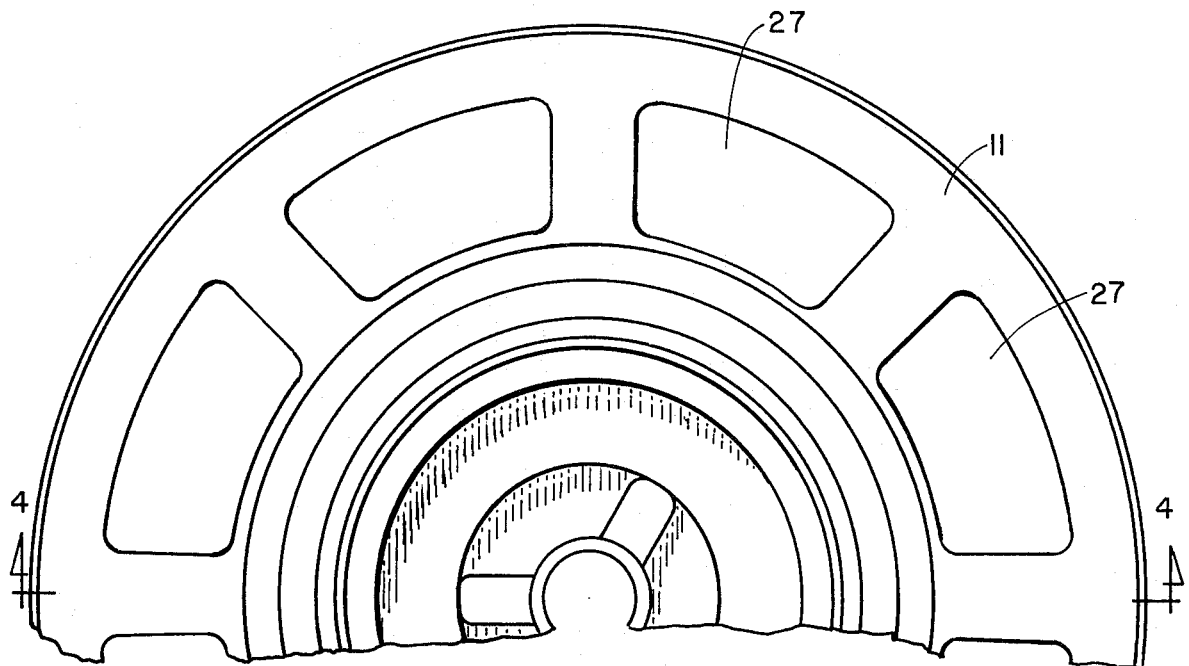
FIG. 3 is a partial top view of the core and platform.
Figure 4:
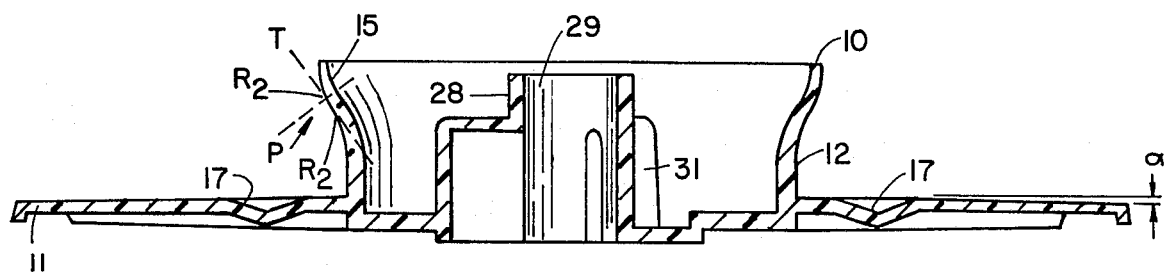
FIG. 4 is a cross section of the core and platform taken along the line 4—4.
Figure 5:
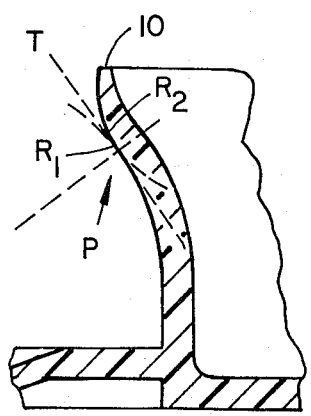
FIG. 5 is an enlarged detail of the core configuration showing the common tangent point.

In accordance with the invention, the core and platform may be molded of plastic in one piece with the core integrally joined to the platform. The configuration of the outer surface of the core is shaped in such a manner as to expedite the release of the inner winding of the endless tape array from the core so that it can be transported to the take-up transducer head with a minimum amount of friction and tape drag in order to avoid distortion of the sound quality of the tape. The configuration also provides for easier molding and release of the unit from the mold. Obviously, the one-piece platform and core will eliminate much extra molding operations and assembly operations thereby minimizing both labor and expenses for the production of these units. The design allows for straight ahead molding. No sliding mold cores are necessary and mold parting lines are eliminated.

Additional improvements are the elimination of deformable designs of the free end portion of the core and forming the surface configuration in such a manner as to minimize friction drag of the tape against the outer and upper free end of the core and to minimize chances of hang-up of the tape on the upper outer surface of the core. To do this, the outer surface of the core is defined by two oppositely facing radiused surfaces meeting to form a common tangent so as to have a continuous angular relation to the top edge of the tape load. This configuration provides the same support and guidance for the tape as the conventional conical shape in current use for core and platforms, but facilitates the release of the tape from the core with the minimum amount of friction or tape drag but yet allows for a unitary molding which is easily released from the mold.

DESCRIPTION OF THE PREFERRED EMBODIMENTS

In accordance with the invention, the core 10 and platform 11 are integrally molded of such plastic as polyethylene, polystyrene or polyoxymethylene type acetal resin in one piece with the core integrally joined to the platform. We find high density polyethylene to be preferred since it has a smooth, slick surface. The outer surface 12 of the core is defined by two oppositely facing radiused surfaces $R_1$ and $R_2$ meeting at their common tangent point P with the radius at the upper free end defining a flared-out configuration. The tangent line T describes an angular continuous, smooth, uninterrupted relation to the top edge of the tape. Stated in another way, the lower attached end has a concave configuration $R_1$ while the upper free end has a convex configuration $R_2$ with each configuration smoothly and continuously radiused into each other with a noninterrupted common tangent. The upper extremity of the core is substantially inflexible. However, the continuously radiused configuration allows the inner winding of the tape 14 to be stripped from the core 10 having the smooth continuous surface and yet give a firm stable configuration of the free end 15 of the core 10.

To help in the orientation of the loaded core 10 and platform 11 with the tape 16, the platform 11 generally comprises a tapered upward surface going radially inward having about a 3 percent incline $\alpha$ up to a point having a downward pointing V-type notch 17 in the platform located substantially under the upper free end 15 of the core 10. The notch 17 enables the tape 16 to nest in the notch 17 and be oriented and nested for pulling out on the inside edge of the winding closest to the core. In other words, the top edge of the tape is oriented upward toward the core.

Referring specifically to the tape 16 and the cartridge 18, it is of a type sold and produced in very large quantities for combination with a player as described and disclosed in U.S. Pat. No. 3,403,868. The player contains a transducer pick-up head (not shown) and a tape driving capstan 19. The cartridge 18 is biasly urged sideward and forward by means of a retention means 20 on a forward inclined ramp 21 in a notch 22 to hold the tape in the cartridge 18 in firm relationship within the player and maintain the cartridge in a fixed position within the player so as to produce nondistorted playing. The tape passes along the front wall 23 of the cartridge closely adjacent to openings 24 which admit the transducer head and the capstan 19 against a pinch roller 25 in the cartridge. A pressure pad 26 biases the tape 16 against the transducer pick-up head in order to assure intimate contact between the tape and the transducer pick-up head.

Referring now more specifically to the one-piece molded core 10 and platform 11 and in particular to the core 10, the outer surface of the core is formed and defined by two surfaces of oppositely facing radiused surfaces $R_1$ and $R_2$ meeting at a common tangent point P. The upper free end has an outward convex surface $R_2$ and the lower attached end has an outward concave surface $R_1$. Specifically, one of the radiused surfaces may be formed from a typically 0.375 inches radius extending from the platform and having an outer concave configuration. On the outer upper end 15 and meeting the first formed radiused surface at a common tangent point P is another radiused surface of nominally 0.250 inches radius having an outer convex configuraton. The two radiuses meet at a smooth, continuous, uninterrupted common tangent point P. The core 10 is relatively inflexible to give maximum support to the tape as it is pulled off the inner winding. On the other hand, the specific configuration of the upper end of the core serves two practical and important functions.

In the past, one of the deficiencies of molding a one-piece platform 11 and core 10 construction was that the dies quite often had to be split and separated in a sideways configuration or would result in mold part lines that were difficult to maintain. This is not only expensive but cumbersome and requires an extra fabrication step. The continuous radiused surface of the present invention allows for a straight ahead molding operation with no sliding mold cores allowing the integrally formed core 10 and platform 11 to be pulled straight out from the mold and being free of mold parting lines. Configurations of other integrally molded core 10 and platform 11 are shaped such that a split-side removed operation is needed to form and remove the core and platform from the mold.

The other function, which is of even greater importance, is that the radiused surfaces serve as a continuous surface without any abutments or points or discontinuities upon which the tape 16 can be hung-up in order that there is a smooth and continuous release of the inner winding of the tape from the core. Yet, since the upper end 15 of the core 10 is continuous and is of relatively inflexible material, there is firm support giving a positive release of the tape from the inner winding. This overcomes the deficiencies of other cores which are made of very thin material or very flexible material thus, giving poor support to the tape. High density polyethylene provides an ideal material for forming a smooth, slippery core surface.

The core 10 is integrally attached to the platform 11 in order to conserve weight, material and fabrication time. The platform often has punched-out voids 27. However, in order to provide platform rigidity and to orient the tape, our platform contains a V-shaped depression 17 located generally beneath the free end of the core. The V-shape depression 17 allows one to use a slotted or punched-out platform and a relatively thin platform and yet get the stable and rigid support as provided by the V-shape notch 17.

In addition, the V-shaped notch 17 performs another more important function; namely, the tape will tend to seat down into the notch and be oriented or nested in a manner to come up from the platform on the incline for pulling out the inner edge of the winding closest to the core. The tape 16 therefore is beveled upward in a position which will accommodate easy release of the inner winding of the tape up to the core. The nesting attitude of the tape is further aided by the upward taper or bevel of the top surface of the platform going from the outer edge toward the core. The notch 17 is positioned generally under the upper free end 15 of the core in the top surface of the platform.

The radial displacement distance from the uppermost part of the core as projected downward is only a distance of about 0.1 of an inch to the innermost projection of the V. Thus, there is an alignment that the inner winding of the tape may be easily transferred to the surface of the core.

A central sleeve 28 having a hollow cylindrical bore 29 is provided for mounting for rotation on the cylindrical post 30 of the cartridge. The sleeve may be made of relatively thin material but in order to reinforce the sleeve some vertically extending reinforcing veins 31 are provided for stiffening and stabilizing the core in order to get smooth rotation of the core around the post and also to provide an interface for driving the assembly during the tape winding.

Thus, a one-piece molded platform 11 and core 10 for an endless array of tape 16 is provided having a relatively inflexible upper core portion 15 but having a configuration such that the core is radially inwardly displaced from the platform. The tape is readily released from the platform to the core. Additionally, the contour is such that a side-pull mold core is not necessary but rather a straight ahead molding may be accomplished, thus saving time and expense and making the mold in operation much simpler.

While the particular embodiment of the present invention has been shown and described specifically hereto set forth, it will be obvious to those skilled in the art that changes and modifications may be made without departing from this invention in its broader aspects.

What is claimed is:

1. An integrally molded platform and core for carrying an endless array of magnetic tape for use in a cartridge comprising:
a disc-shaped platform for holding the lower edge of the array of tape;
a core integrally molded centrally to the platform, said core having:
a minimum outer diameter at its lower end connected to the platform,
a maximum outer diameter at its upper free end, said core defined at its outer surface by:
an outward convex upper free end portion, and
an outward concave lower portion connected to the platform,
said portions connected at a common tangent point at generally the mid-height of said core to form a smooth, continuous outer surface.

2. An integrally molded platform and core according to claim 1 in which the top surface of the platform contains a depression to orient the tape to be wound off the inside of the array, said depression situated generally radially under the upper free end of the core.

3. An integrally molded platform and core according to claim 2 in which the platform has a beveled top surface tapering upward from the radial edge toward the centrally located core.

4. An integrally molded platform and core according to claim 1 in which the core is relatively rigid and inflexible.

5. An integrally molded platform and core according to claim 4 in which the core is high density polyethylene.

6. An integrally molded platform and core according to claim 1 in which the unitary structure is free of any transverse mold parting line.

7. An integrally molded platform and core for carrying an endless array of magnetic tape for use in a cartridge comprising:
a disc-shaped platform for holding the array of tape along its lower edge;
a continuous, uninterrupted, smooth curvilinear core integrally molded centrally to the platform, having:
a lower end molded to the platform and defined by a concave outer surface,
an upper free end defined by a convex outer surface, said concave outer surface and said convex outer surface meeting generally mid-height of the core at a common tangent point defining a continuous uninterrupted smooth outer surface.

8. In an integrally molded platform and core for carrying an endless array of magnetic tape for use in a cartridge, the improvement comprising:
the core integrally molded centrally to the platform and having an outer surface defined by an outward convex portion at an upper free end and an outward concave portion at a lower part integrally connected to the platform, said portions connected at a smooth continuous uninterrupted common tangent point generally at its mid-height and having a maximum radius at its upper free end convex portion and having a minimum radius at its lower connected concave portion.

\* \* \* \* \*